United States Patent
Cifuentes Lopez

(10) Patent No.: US 10,746,345 B2
(45) Date of Patent: Aug. 18, 2020

(54) DEVICE FOR ANCHORING AND PROTECTING SELF-SERVICE TERMINALS AND VAULTS IN GENERAL

(71) Applicant: TECNOLOGIA BANCARIA S.A., Barueri, SP (BR)

(72) Inventor: Edson Igor Cifuentes Lopez, Barueri (BR)

(73) Assignee: TECNOLOGIA BANCÁRIA S.A., Barueri, SP (BR)

( * ) Notice: Subject to any disclaimer, the term of this patent is extended or adjusted under 35 U.S.C. 154(b) by 0 days.

(21) Appl. No.: 16/238,020

(22) Filed: Jan. 2, 2019

(65) Prior Publication Data

US 2019/0203872 A1    Jul. 4, 2019

(30) Foreign Application Priority Data

Jan. 3, 2018   (BR) .......................... 1020180001272

(51) Int. Cl.
*F16M 9/00* (2006.01)
*E02D 27/44* (2006.01)
*F16M 7/00* (2006.01)

(52) U.S. Cl.
CPC .............. *F16M 9/00* (2013.01); *E02D 27/44* (2013.01); *F16M 7/00* (2013.01)

(58) Field of Classification Search
USPC ....................................................... 248/551
See application file for complete search history.

(56) References Cited

U.S. PATENT DOCUMENTS

| | | | |
|---|---|---|---|
| 4,037,700 A * | 7/1977 | Heraty ...................... | G07F 9/06 194/350 |
| 4,731,819 A * | 3/1988 | Kalfon ...................... | G07F 9/06 109/52 |
| 4,795,087 A * | 1/1989 | Procak ................. | G07B 15/066 232/16 |
| 6,508,349 B1 * | 1/2003 | Lewin ................... | G07F 17/248 194/350 |
| 7,427,054 B2 * | 9/2008 | Sommerville ........ | G07F 19/205 248/551 |
| 2015/0240988 A1 * | 8/2015 | White .................... | F16M 13/02 248/552 |

* cited by examiner

*Primary Examiner* — Monica E Millner

(57) ABSTRACT

"DEVICE FOR ANCHORING AND PROTECTING SELF-SERVICE TERMINALS AND VAULTS IN GENERAL", developed for application on self-service bank terminals (ATMs), as well as cash dispensing equipment, ATM recyclers, recycler vaults and general vaults, as defense against frequent theft in which the equipment is fully displaced using backhoe loaders, said device basically comprising a box (2) and a vertical and central lower column (3), four bearings (6), each including a strap (7) and, below said box (2), a laminate support panel (21), partially vented and including vertical setting screws (5) for height adjustment; in addition, pins (14) driven by springs (16) are provided, said pins (14) being released when the self-service terminal (ATM) is lifted at least 3 mm from the ground, releasing said equipment anchoring plate (15) and, consequently, causing said ATM to drop down inside the metallic box (2) and providing, therefore, increased defense against criminal raids using backhoe loaders, even on sandy soils, with said device being capable of moving downwards at an attempt of lifting the equipment (ATM).

7 Claims, 9 Drawing Sheets

DEVICE FOR ANCHORING AND PROTECTING SELF-SERVICE TERMINALS AND VAULTS IN GENERAL

FIELD OF APPLICATION

This specification relates to an invention patent application that refers to an anchoring and anti-theft device notably developed for application to ATMs (Automatic Teller Machines), Self-Service Bank Terminals, as well as other cash provision equipment, also known as cash dispensers, recycling ATMs, recycler vaults and general vaults, particularly belonging to the field of safety devices applied to self-service terminals with release by encoded card for providing or receiving money or similar.

INTRODUCTION

As is commonly known, for many years bank institutions have been offering a range of facilities to their customers, among which are the outdoor self-service machines known as ATMs, where various types of operations may be performed, particularly cash withdrawals, cash deposits, payments, etc.

STATE OF THE ART

Currently, considering that each self-service terminal has a chance of containing significant amounts, said self-service terminals are being raided by criminals in many ways.

Robbers make use of various methods, from explosives to a wide range of tools such as, for example, electric cutting disc equipment, blowtorches, plasma, thermal lances, among others.

However, nowadays, due to some anti-theft devices being developed and installed inside said self-service terminals, some raiding methods are no longer used, as the protective layers of the vaults of self-service terminals are increasingly harder and time-consuming to breach, including smoke and paint generation devices, among others, that draw large attention from passersby.

The applicant for this invention patent application, a stakeholder at the safety bank equipment and devices, has filed on INPI other self-service terminal safety equipment and devices, among which is PI 0802509-6, filed on Jul. 14, 2008, entitled "METODOLOGIA PARA REFORÇO E FIXAÇÃO ATRAVÉS DE BASE DE ANCORAGEM DE EQUIPAMENTOS BANCÁRIOS [METHODOLOGY FOR REINFORCEMENT AND SECURING THROUGH ANCHORING BASE FOR BANK EQUIPMENT]" and that discloses a methodology intended for reinforcement and securing of ATM and cash dispenser equipment types, said methodology establishing the installation of sleeves on said equipment, and said sleeves are protection plates installed inside vaults, basically comprising a metal-plated box, internally including material layers to provide protection against break-ins, the first material layer within the box that comprises the sleeve being a chemical compound that provides protection against attacks with blowtorches, while the second layer is preferably made of concrete which provides mechanical strength to the parts; the chemical protection comprised in the layer is essentially a flammable compound including, preferably, bitumen, rosin and sulfur in properly specified amounts and thicknesses; whereas the layer that constitutes the mechanical protection is preferably obtained in armed concrete with cement, aluminum oxide with several granulations and drawn steel wires in specified amounts.

Even if a criminal manages to breach the structure of a self-service terminal—ATM, other protection devices are placed in order to slow down the criminal's actions.

ISSUES WITH THE STATE OF THE ART

In view of the obstacles presented to criminals by safety devices currently incorporated to ATMs, other raiding methods were adopted by criminals against such type of terminal, such as full removal of the equipment using backhoe loaders.

Current securing systems for these self-service terminals—ATMs, for the most part, cannot withstand criminal raids using backhoe loaders due to several factors, among which are excessive force applied to anchoring bolts that are eventually broken due to shearing or exceeding the tensile strength of said bolts.

Another factor that undermines the retaining strength of the ATM terminal is sandy soil, which prevents proper grip of the anchoring kit that is bolted to the ground.

The mix and design of the concrete used in anchoring, if incorrectly performed, may be yet another negative and important aspect that defines the susceptibility of the ATM terminal to criminal raids.

Furthermore, the current anchoring format provides easier lifting of the self-service terminal using the trench end of a backhoe loader.

Finally, its rigid assembly renders bolts more susceptible to impacts to which the equipment is subjected during a raid, and subsequent break.

OBJECTS OF THE INVENTION

In view of the issues existing in the state of the art, one of the objects of this invention patent application is to provide a device for anchoring and protecting self-service terminals and vaults in general, which aims at solving the issue of full displacement of the ATM equipment in the form of a system for causing a partial and programmed drop at a previously prepared location, as soon as the trench end of the backhoe loader, in an attempt to lift the ATM equipment, manages to lift it beyond 3 mm high, activating the device and, therefore, frustrating the theft attempt.

BRIEF DESCRIPTION OF THE INVENTION

In order to address the aforementioned drawbacks and provide improvements to the consumer market, the inventor created and developed this "DEVICE FOR ANCHORING AND PROTECTING SELF-SERVICE TERMINALS AND VAULTS IN GENERAL", which should attain a position of prominence among similar devices and stake a claim in the bank safety equipment business and industry, due to featuring an anchoring and protection system against ATM equipment theft, providing higher resistance against criminal raids using backhoe loaders, even on sandy soil.

BRIEF DESCRIPTION OF THE DRAWINGS

The subject-matter of this invention will become clear regarding its technical aspects upon the detailed description of the figures below referred, in which.

DETAILED DESCRIPTION OF THE INVENTION

Figure 1:
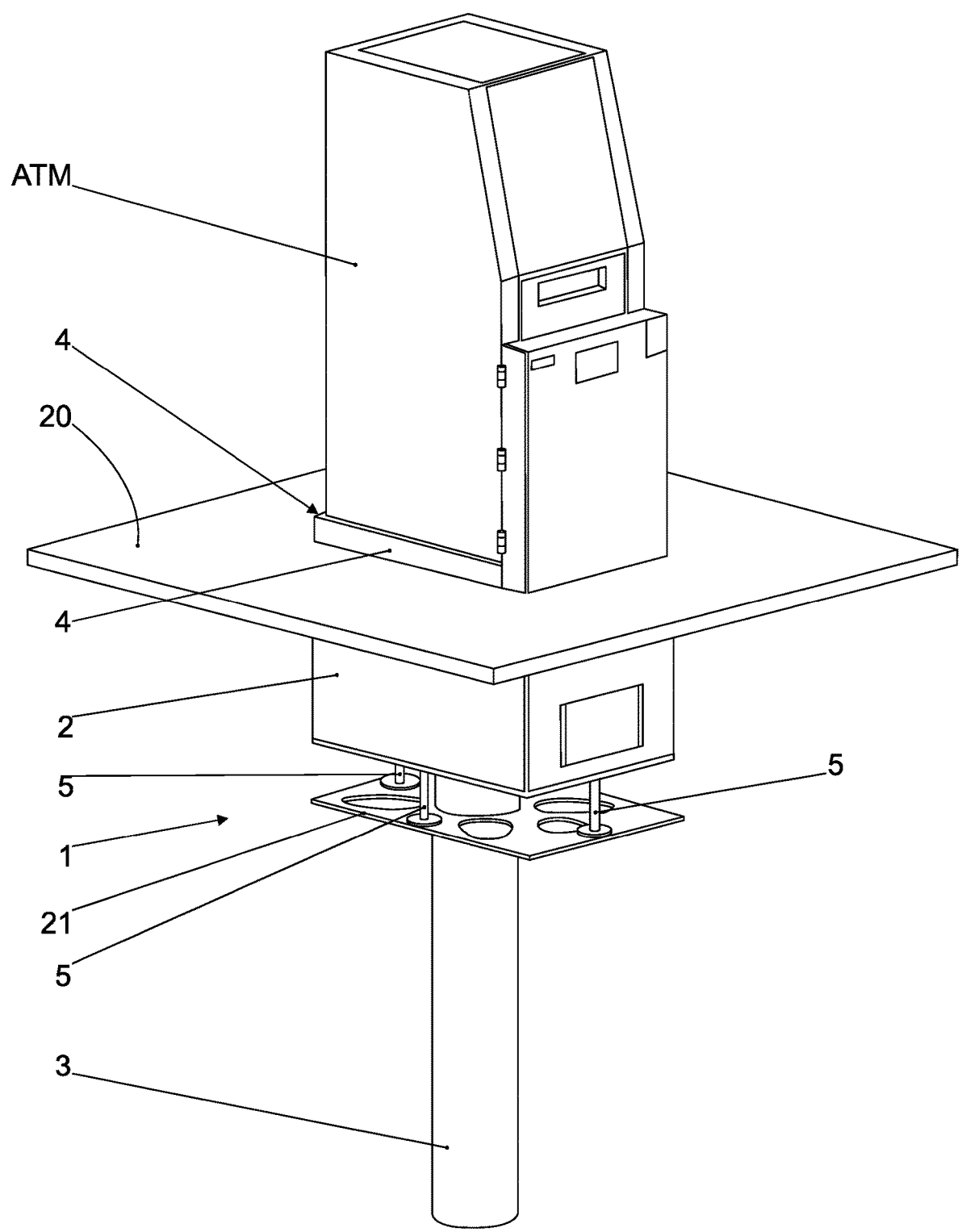
FIG. 1 shows a perspective view of a self-service terminal—ATM with the anchoring and anti-theft device applied.
Figure 2:
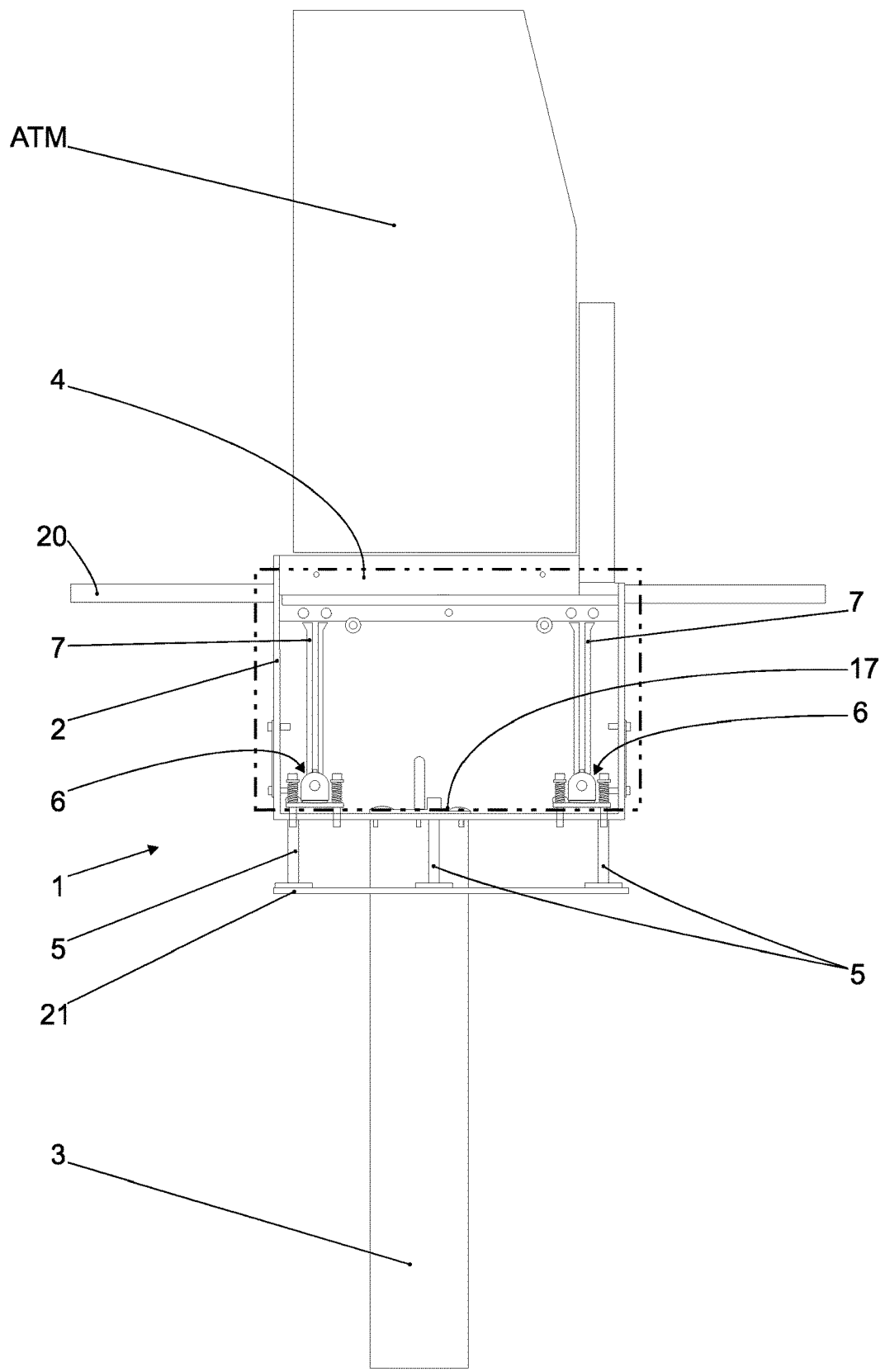
FIG. 2 shows a side view of a self-service terminal—ATM with the anchoring and anti-theft device applied.
Figure 2A:
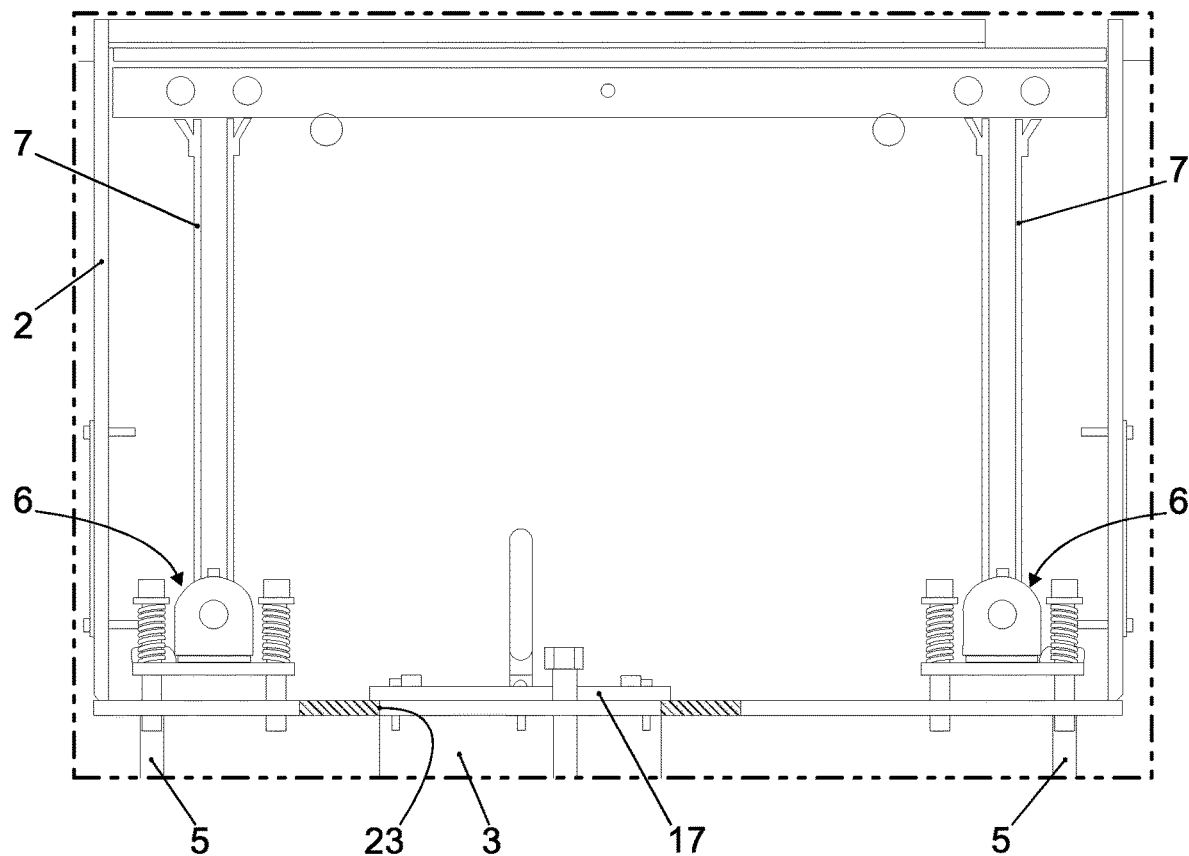
FIG. 2A shows an enlarged detail of the anchoring and anti-theft device, particularly illustrating the carbon steel plated box, the load hoisting strap, the bearing assembly and the equipment anchoring plate.
Figure 3:
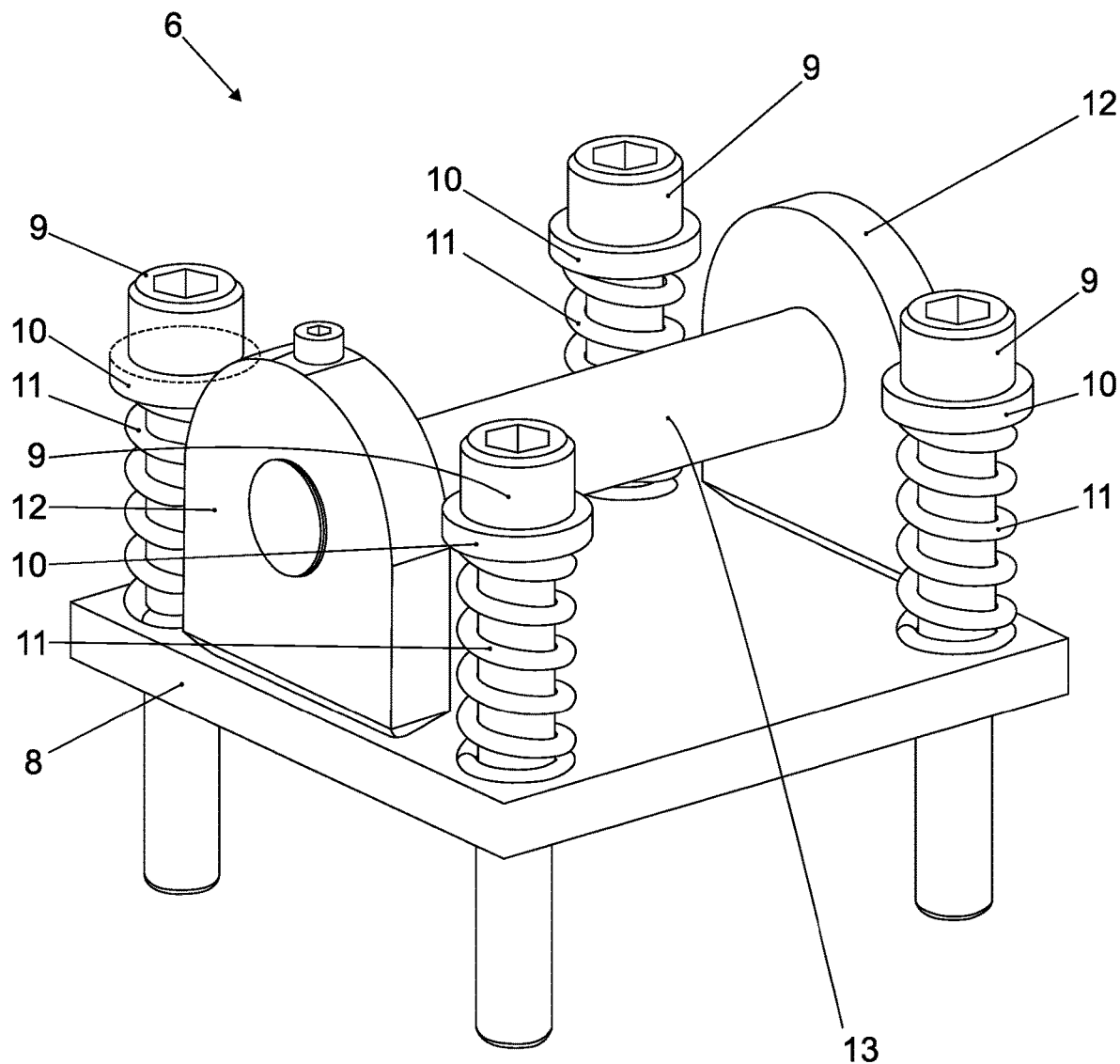
FIG. 3 shows the device bearing, particularly the spring for absorbing impact, the bearing anchoring bolt and the anchoring bearing of the hoisting strap.
Figure 4:
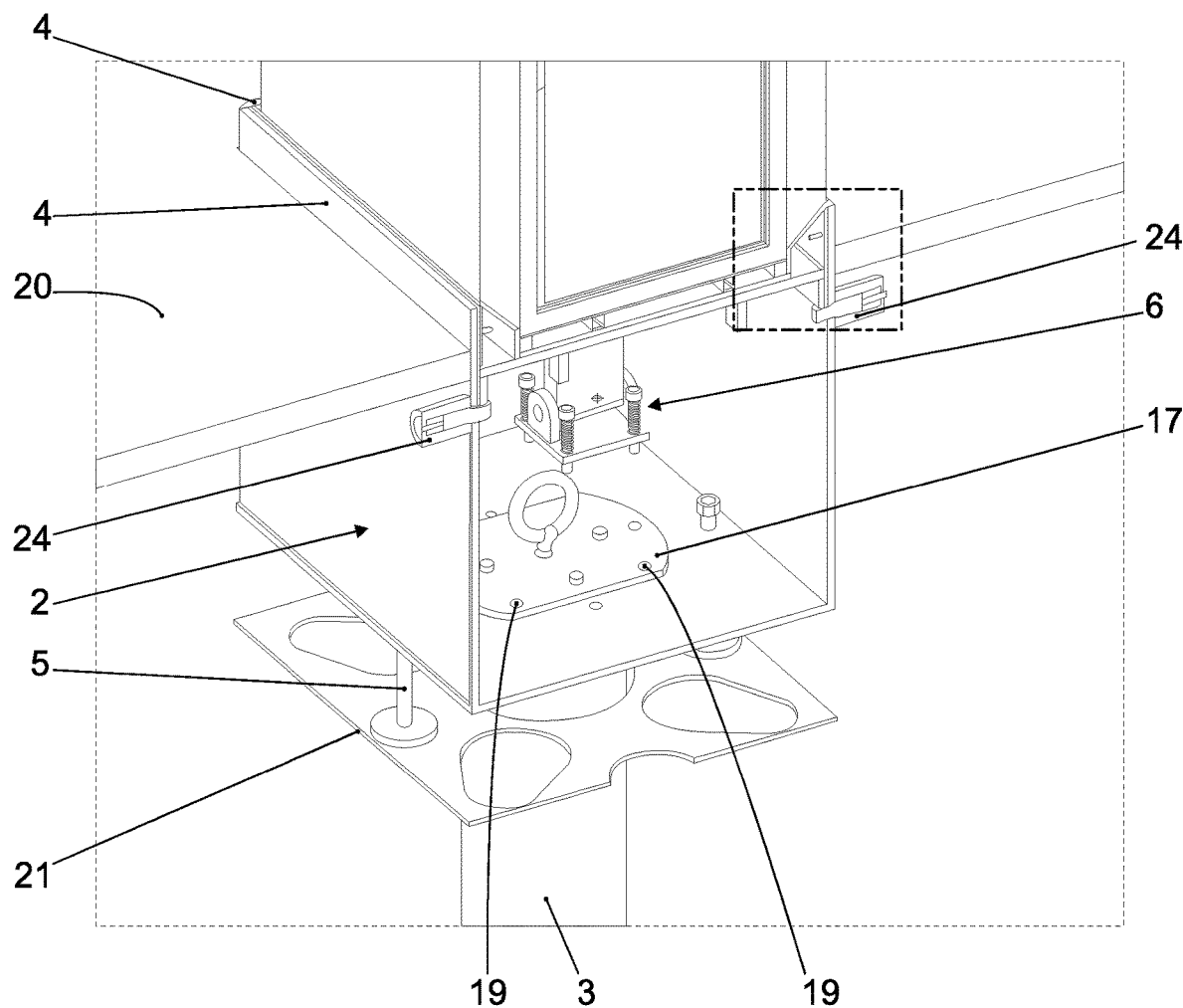
FIG. 4 shows a perspective view of the lower part of the self-service terminal.
and the anchoring device.
Figure 4A:
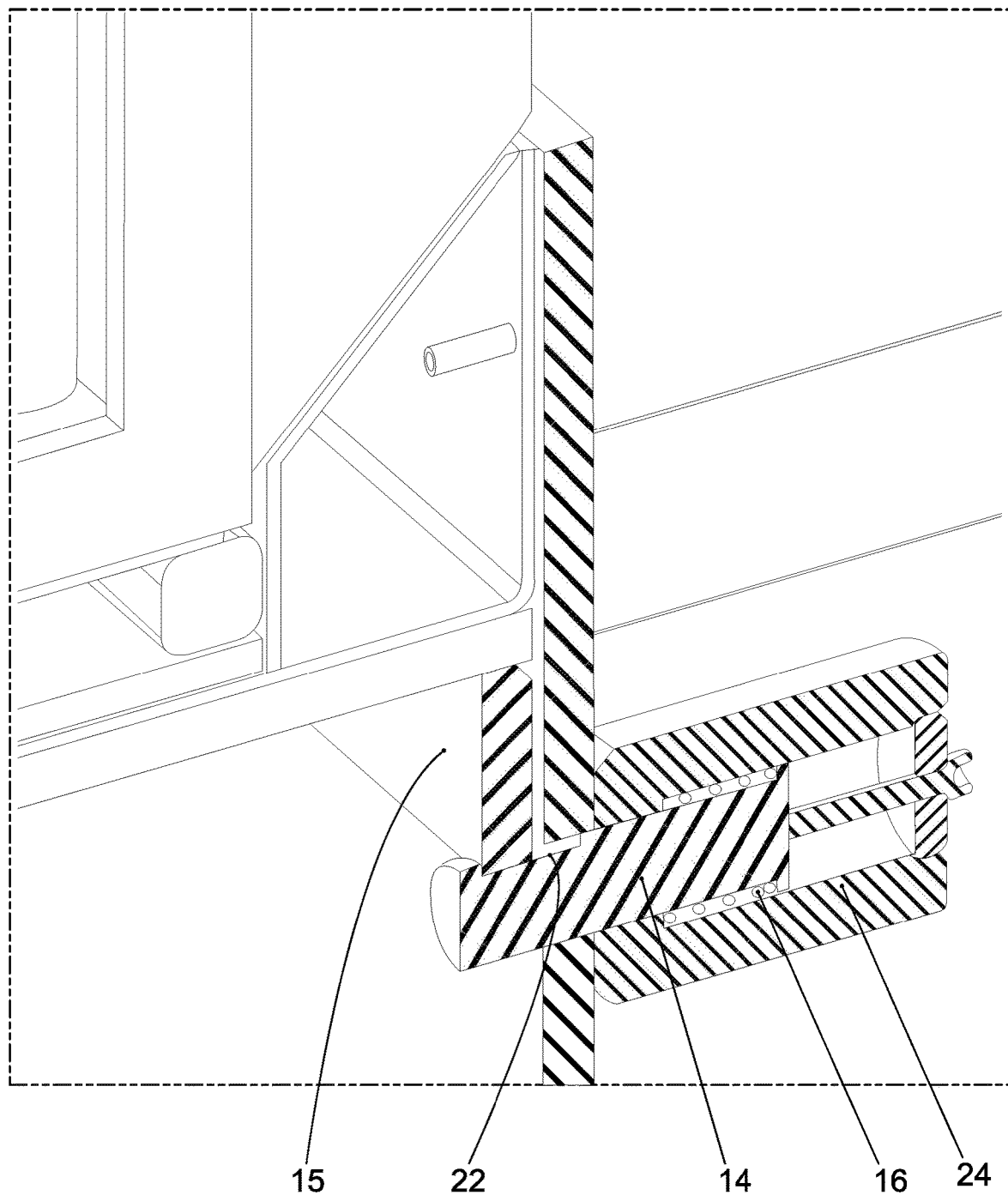
FIG. 4A shows a detail, in perspective, of the equipment anchoring plate supported on spring-driven pins.

In agreement with the information provided by the figures above, this invention "DEVICE FOR ANCHORING AND PROTECTING SELF-SERVICE TERMINALS AND VAULTS IN GENERAL", represented by reference number 1, features an anchoring structure defined by a box 2 manufactured in metallic material and a vertical and centrally positioned lower column 3 made of pre-cast concrete, and the only part of the structure of the box 2 placed above the ground are the outer vertical walls 4, which are placed 100 mm above the ground, while the rest is placed below the ground level.

Therefore, the device 1 is assembled immediately below the ATM terminal which, as previously said, comprises a box 2 which is supported against a central cylindrical column 3, with said box 2 including a protrusion corresponding to the protrusion of said ATM terminal.

The box 2 is manufactured from metal panels, preferably carbon steel panels, below which a laminate support panel 21 is placed, partially vented and notably developed for adjusting the height of the assembly, through vertical setting screws 5 placed along said height adjustment panel 21.

The upper surface of the box 2 of the anchoring device 1 receives a set of vertical walls 4 developed from the upper surface of the box 2 providing minor height and peripherally placed, and said vertical walls 4, three in total, are responsible for surrounding the ATM terminal externally.

In each of the inner corners of the box 2, more particularly in its lower inner surface, the following is provided: the bearing assembly 6 with a vertical strap 7 for load lifting.

Each bearing assembly 6 includes a base 8, where four bolts 9 are placed, along with upper flanges 10 enveloped in springs 11.

Between the two pairs of said bolts 9, two vertical flaps 12 are included, protruding from the opposite edges of the base 8 and supporting a horizontal shaft 13 which, in turn, is enveloped by the respective load lifting strap 7.

Therefore, the anchoring device 1 DAP includes vertical screws 5, called spacers, which allow for height adjustment as well as the flow of concrete C to column 3 for proper concreting.

As previously said, the metallic structure is shaped by a box 2 made from carbon steel plates or other material with equivalent features, in which four bearings 6 are installed, which are anchored by bolts 9 and springs 11, each of the bearings 6 including a strap 7 for providing traction with the upper surface of said box 2, where the anchoring of said anchoring device 1 is carried out.

The bearing 6 is anchored by bolts 9 and springs 11, with the purpose of absorbing all impact generated during "Ram raids" (variation on theft in which a van, truck, SUV, car or other heavy vehicle is driven through the windows or doors of a closed store, usually a jewelry or department store, in order to enable stealing of goods from inside the location and vertical displacement of the ATM terminal, causing the release of the support bolts 14 of said ATM terminal and, therefore, enabling movement towards the inside of the metallic box 2.

The anchoring plate 15 of the equipment is supported by four bolts 14, which are internally mounted in cylindrical structures 24 and kept constantly tensioned by springs 16, and said bolts are released when the self-service terminal ATM is lifted at a minimum 3 mm height, releasing said equipment anchoring plate 15 and, consequently, causing it to drop down inside the metallic box 2.

The self-service terminal ATM remains in use position, due to an upper cross-span channel 22 placed at the support end of each of the support bolts 14, which are only retracted due to action of the springs 16, as soon as the ATM terminal anchoring plate 15 is lifted, along with the structure of said ATM terminal, for, at least, 3 mm.

A hole 23 is provided within box 2, in order to allow passage of the pre-cast column 3, with said column introduced and placed from the inner part of said box 2 and a flange 17 is fixed to the upper surface of column 3, preferably through welding, and anchored to the metallic box 2 (carbon steel) through bolts 19.

After placement of the component parts, the box 2 and the column 3, concreting is carried out, thus joining the pieces together.

When the ATM terminal is raided with a backhoe loader, which applies a force on said ATM terminal, parallel to the ground, the walls 4 which are part of the metallic box 2, all of which are placed above the ground, support the floor 20, preventing the screws from shearing; said walls 4 also prevent that the trench end of a backhoe loader is placed between the ground and the base of the vault, in order to perform the lifting.

The walls 4 also serve as a turning radius to enable lifting for, at least, 3 mm, required for releasing the machine supporting pin 16.

Figure 5:
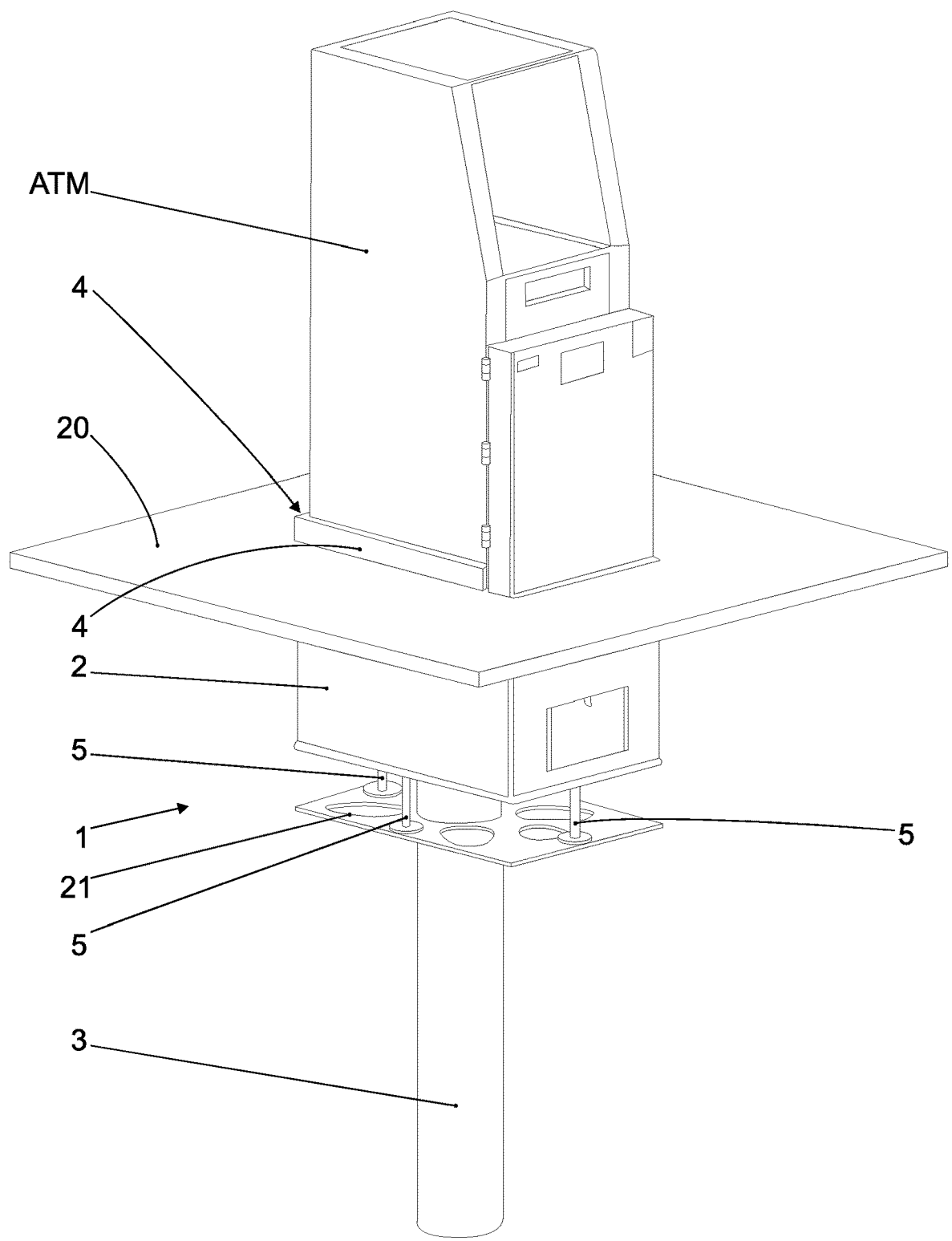
FIGS. 5 and 5A show, respectively, a self-service terminal with the anchoring device applied underneath and in use conditions, and a self-service terminal after activation of the proposed anchoring device.
Figure 5A:
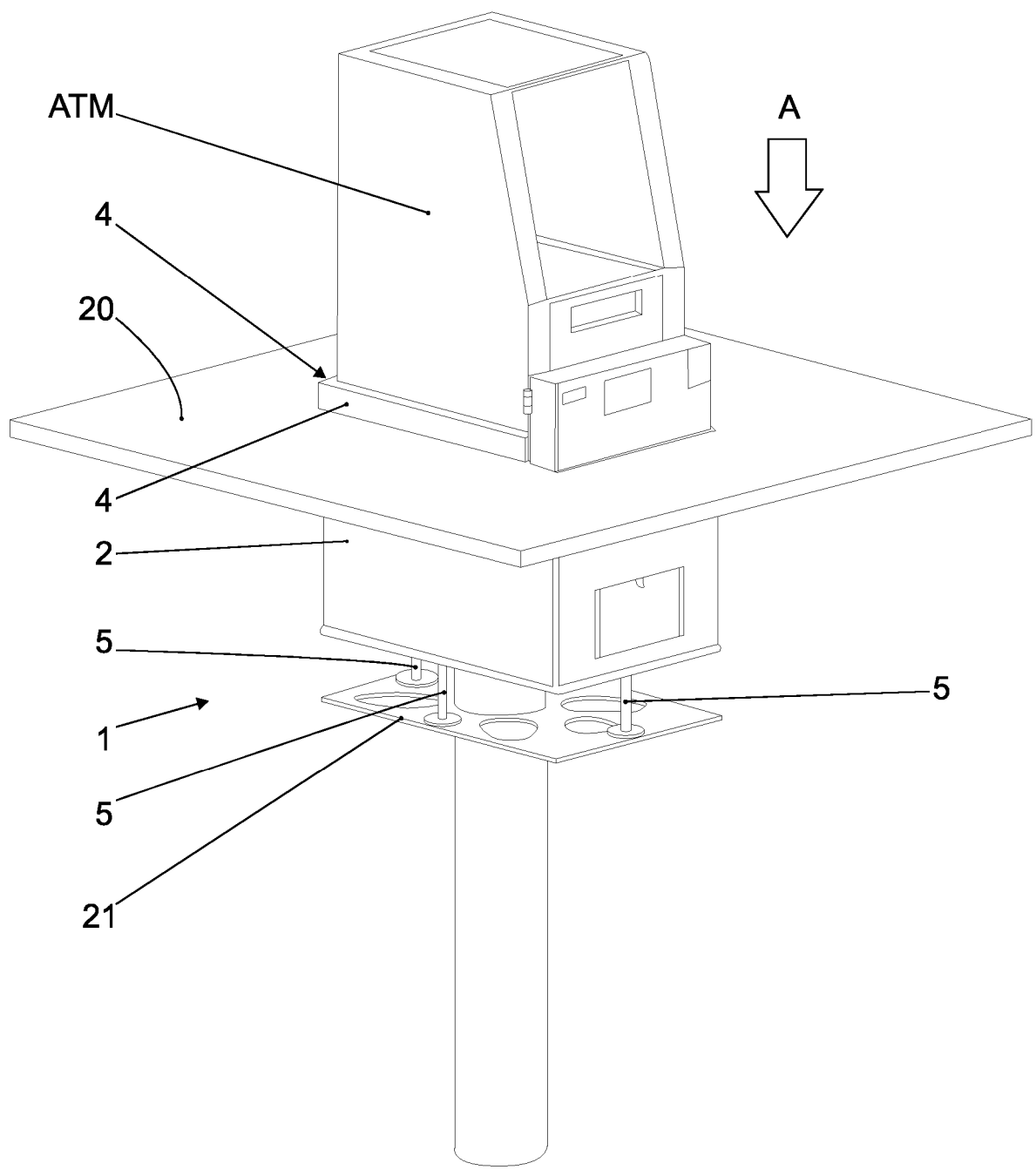
Figure 6:
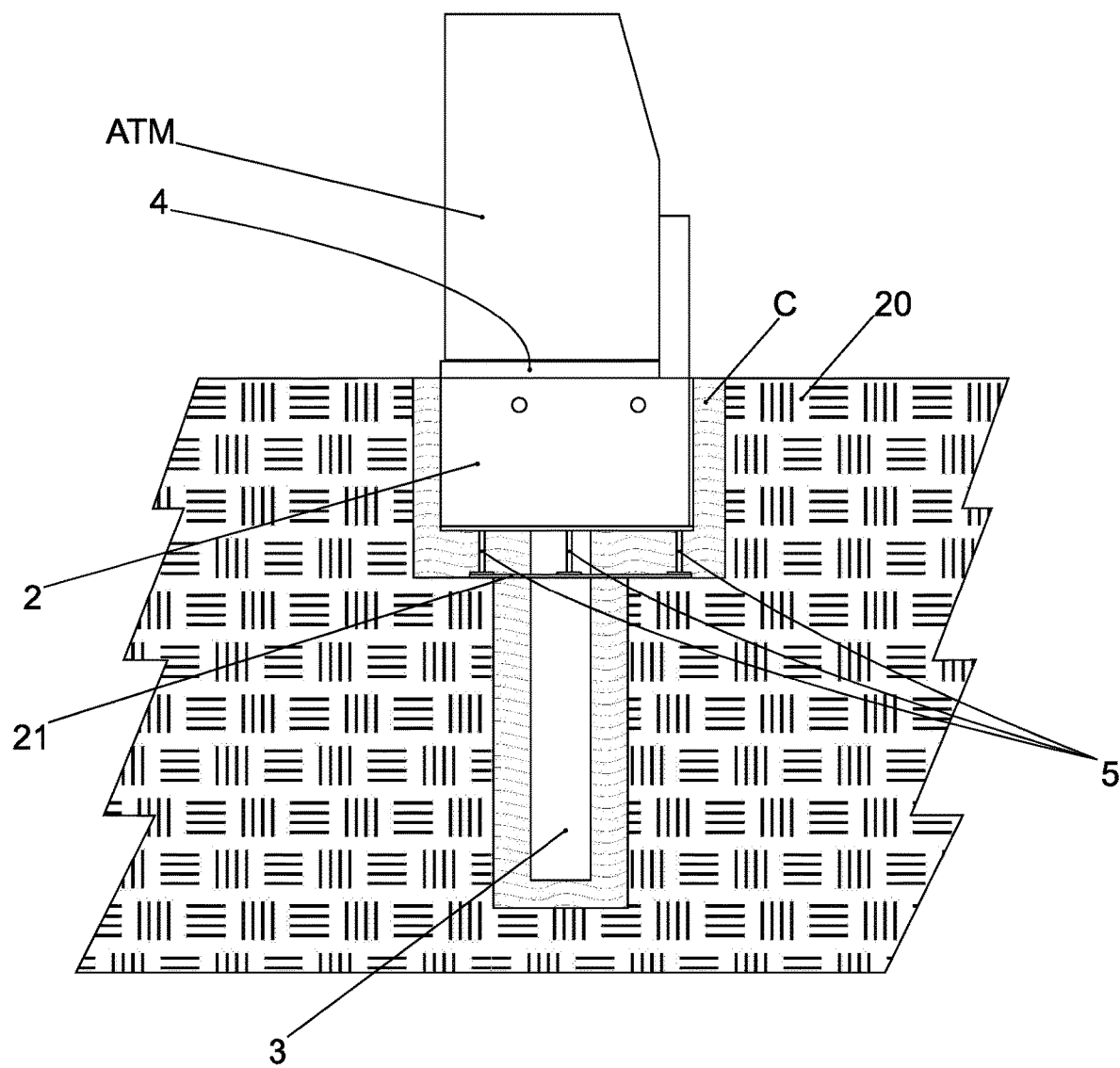
FIG. 6 shows a sectioned side view of the device installed on the ground with the self-service terminal in its working position, illustrating the area required to embed the device, where the box is positioned, the lower column and the surrounding area where a certain volume of concrete is applied for bolting the parts.

After lifting, the pins 14 are pushed out by springs 16 that allow, due to gravity, the ATM terminal to fall, such as indicated by arrow "A" of FIG. 5A, for the metallic box 2, thus preventing opening and posing a considerable obstacle to full removal of the equipment.

The metallic box 2 includes a fitting hole for the column 3 which is anchored to the metallic box 2 itself through the flange 17, while said column 3, by default, also prevents that the ATM machine is displaced from its vertical position, granting resistance against impacts to the side of the vault.

The anchoring plate 15, where the self-service terminal ATM is fixed, includes bearings 6 developed for fastening the other end of the strap 7; the pins 14 are also locked to said plate, which release the self-service terminal ATM for dropping down in case of a raid.

The load lifting straps 7 are sized in order to withstand tension up to twenty tons per bearing 6, with four bearings 6 included, responsible for withstanding the tension between the equipment and the metallic box 2; said bearings 6, in turn, are anchored by bolts 9 and springs 11, the latter bring responsible for absorbing direct impact to the bolts 9.

In order to install said DAP anchoring and protection device proposed herein, and to bolt said device 1, a height adjustment device is installed, notably developed to establish proper access and allow concrete C to flow down to the end of column 3, with said adjustment being carried out by a laminate panel 21 which, on sandy soils, enables height adjustment.

Although the invention is detailed herein, it shall be understood that it is not limited in application to the details and steps described above. The invention may be deployed in other models and practiced or carried out in a variety of modes. It shall be understood that the terminology applied herein is for descriptive purposes only, and no limitation.

The invention claimed is:

1. A device for anchoring and protecting self-service terminals and vaults to a ground, comprising:
    a box manufactured in a metallic material, and
    a column made of pre-cast concrete, wherein the box and the column are concreted together,
    wherein a structural part of the box placed above the around comprises at leas one outer wall;
    wherein the device is mounted immediately below a self-service terminal (ATM) said device featuring a protrusion corresponding to a protrusion of said self-service terminal (ATM);
    wherein a laminate support panel is placed below the box, said laminate support panel is partially vented and includes spacers placed along the laminate support panel;
    wherein a bearing assembly and a load lifting strap are provided on each inner corner of the box,
    wherein each bearing assembly includes a base comprising four bolts with upper spring-enveloped flanges, and between two pairs of the bolts with the upper spring-enveloped flanges, two flaps protrude from opposite edges of the base and support a shaft surrounded by the load lifting strap;
    the anchoring device further comprises:
        an anchoring plate supported on four pins, each of which are internally mounted in a cylindrical structure; and
        a hole provided inside the box for passage of the column,
    wherein the column is inserted and positioned from within the box and a flange is fixed to the column and bolted to the box.

2. The anchoring device according to claim 1, wherein the four pins are constantly tensioned by springs, said pins are released when the self-service terminal (ATM) is lifted at least 3 mm above ground, and releasing said anchoring plate to drop down inside the box.

3. The anchoring device according to claim 1, wherein each load lifting strap is configured to withstand up to twenty tons of tension per bearing assembly.

4. The anchoring device of claim 1, wherein the structural part of the box is placed 100 mm above the ground.

5. The anchoring device of claim 1, wherein the box is manufactured from carbon steel.

6. The anchoring device of claim 1, wherein the bearing assembly and load lifting strap are provided on an inner lower surface of each inner corner of the box.

7. The anchoring device of claim 1, where the flange is welded to an upper side of the column.

\* \* \* \* \*